United States Patent
Chiueh et al.

(10) Patent No.: US 8,225,317 B1
(45) Date of Patent: Jul. 17, 2012

(54) INSERTION AND INVOCATION OF VIRTUAL APPLIANCE AGENTS THROUGH EXCEPTION HANDLING REGIONS OF VIRTUAL MACHINES

(75) Inventors: Tzi-cker Chiueh, Setauke, NY (US); Matthew Conover, East Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 515 days.

(21) Appl. No.: 12/477,810

(22) Filed: Jun. 3, 2009

Related U.S. Application Data

(60) Provisional application No. 61/170,437, filed on Apr. 17, 2009.

(51) Int. Cl.
G06F 9/455 (2006.01)
G06F 11/00 (2006.01)
H04L 29/06 (2006.01)

(52) U.S. Cl. ............ 718/1; 713/164; 713/165; 713/166; 726/22; 726/23; 726/24

(58) Field of Classification Search ........................ None
See application file for complete search history.

(56) References Cited

U.S. PATENT DOCUMENTS

| | | | |
|---|---|---|---|
| 7,191,441 B2 * | 3/2007 | Abbott et al. ................ | 718/1 |
| 7,647,589 B1 * | 1/2010 | Dobrovolskiy et al. .......... | 718/1 |
| 2008/0282241 A1 * | 11/2008 | Dong ........................... | 718/1 |
| 2009/0241109 A1 * | 9/2009 | Vandegrift et al. ............ | 718/1 |
| 2010/0138815 A1 * | 6/2010 | Schneider ...................... | 717/141 |

OTHER PUBLICATIONS

Ferrie et al., Virus Analysis 1; Virus Bulletin Oct. 2003, accessed from: peterszor.com/welchia.pdf.*
Vitaly Shmatikov, Malware: Worms and Botnet, CS 378, available since Fall 2007 (web.archive.org/web/20071227231653/h_t_t_p_:_/_/_www . cs.utexas.edu/~shmat/courses/cs378_spring07/), www.cs.utexas.edu/~shmat/courses/cs378_spring11/botnets.pdf.*
Mathur & Zhang, Virus bulletin Conference Oct. 2011, accessible from www.mcafee.com/hk/resources/reports/rp-packer-layers-rogue-antivirus-programs.pdf.*

(Continued)

*Primary Examiner* — Meng An
*Assistant Examiner* — Bing Zhao
(74) *Attorney, Agent, or Firm* — Advantedge Law Group

(57) ABSTRACT

A method for inserting an agent of a virtual appliance into a virtual machine. The method may include inserting, into an exception handler memory location of a virtual machine, one or more computer-executable instructions configured to facilitate transfer of control from the virtual machine to an agent-insertion module. The method may also include triggering an exception during execution of the virtual machine to cause the one or more computer-executable instructions in the exception handler memory location to be executed. The method may further include obtaining control from the virtual machine after the at least one computer-executable instruction executes. The method may include inserting the agent of the virtual appliance into the virtual machine. Various other methods, systems, and computer-readable media are also disclosed.

20 Claims, 11 Drawing Sheets

OTHER PUBLICATIONS

Joshi, Ashlesha et al.; "Detecting Past and Present Intrusions through Vulnerability-Specific Predicates"; SOSP 2005; Oct. 23-26, 2005; Brighton, United Kingdom.

Garfinkel, Tal et al.; "Terra: a virtual machine-based platform for trusted computing"; SOSP 2003: Proceedings of the Nineteenth ACM Symposium on Operating Systems Principles.

Payne, Bryan D. et al.; "Lares: An Architecture for Secure Active Monitoring Using Virtualization"; Proceedings of the 2008 IEEE Symposium on Security and Privacy (sp 2008).

Peter Ferrie et al; Virus Analysis 1—Worm Wars; Virus Bulletin, virusbtn.com; pp. 5-8; Oct. 2003.

Vitaly Shmatikov; Malware: Worms and Botnets; www.cs.utexas.edu/~shmat/courses/cs378_spring11/botnets.pdf; Downloaded on Mar. 12, 2012.

Rachit Mathur et al.; Analysing the Packer Layers of Rogue Anti-Virus Programs; Virus Bulletin Conference; pp. 155-160; Oct. 2011.

\* cited by examiner

INSERTION AND INVOCATION OF VIRTUAL APPLIANCE AGENTS THROUGH EXCEPTION HANDLING REGIONS OF VIRTUAL MACHINES

CROSS REFERENCE TO RELATED APPLICATION

This application claims priority to U.S. Provisional Application No. 61/170,437, titled "Stealthy Driver Injection and Execution in a Virtual Appliance Architecture," and filed 17 Apr. 2009, the disclosure which is incorporated, in its entirety, by this reference.

BACKGROUND

One of the most compelling uses of virtualization technology is its ability to consolidate applications originally running in multiple machines into a single physical server by executing each of them in a separate virtual machine. For virtual machines running on the same physical machine, significant redundancy among them is likely to exist. Memory de-duplication, which is supported in various virtualization systems, aims to eliminate memory resource waste due to such redundancy. However, because of mismatch in page alignment and use of physical pointers, not all memory-level redundancy can be effectively and efficiently uncovered.

Another way to eliminate this redundancy is through kernel component refactoring, which takes out common kernel components shared by virtual machines running on the same physical machine and runs them on a separate virtual machine called a virtual appliance. A virtual appliance execution architecture may provide several advantages. First, the overall resource usage may be reduced because the inter-virtual machine redundancy is minimized. Second, the development effort for common kernel components may also be reduced because they now may be developed in a way that is largely independent of the platforms of the user virtual machines. Finally, for security-related kernel components, moving common kernel components into a separate virtual machine may render the common components immune from kernel compromises in user virtual machines.

Many applications running on a virtual appliance may need to interact with the user virtual machines when certain events occur. For example, when an anti-virus scanning virtual appliance application detects an anti-virus string signature in a user virtual machine's physical memory block, the virtual appliance may need to first identify to which process the memory block belongs, and then terminate the process if necessary. To find out which process owns which physical memory blocks and then terminate these processes may involve invoking systems service functions specific to the user virtual machine in question, and thus cannot be directly initiated by the virtual appliance virtual machine, which is outside the user virtual machine. One way to address this problem is to install in each of the user virtual machines an in-guest agent that acts as a proxy which retrieves information from, and exercises control over, the user virtual machine in which it is located.

Unfortunately, conventional virtual-appliance agent insertion and invocation may be inefficient and/or ineffective. For example, installing an agent in a user virtual machine may involve substantial effort for data center administrators. Furthermore, putting the agent of a security-related virtual appliance application into a user virtual machine may introduce the risk that a kernel rootkit (or other malware) in the user virtual machine may disable or tamper with the agent and thus indirectly cripple the associated virtual appliance application.

SUMMARY

The instant disclosure presents various methods and systems for inserting and invoking an agent of a virtual appliance. For example, an agent-insertion module (e.g., a module of a virtual appliance) may insert, into an exception handler memory location of a virtual machine, one or more computer-executable instructions configured to facilitate transfer of control from the virtual machine to an agent-insertion module. The agent-insertion module may also trigger an exception during execution of the virtual machine to cause the one or more computer-executable instructions in the exception handler memory location to be executed. The agent-insertion module may obtain control from the virtual machine after the at least one computer-executable instruction executes and inserts the agent of the virtual appliance into the virtual machine.

In various embodiments, the agent-insertion module may insert, into a first memory location of the virtual machine, one or more computer-executable instructions configured to allocate a region of memory for the agent of the virtual appliance. In such embodiments, inserting the one or more computer-executable instructions into the exception handler memory location of the virtual machine may include inserting, into the exception handler memory location of the virtual machine, one or more computer-executable instructions configured to transfer execution to the first memory location of the virtual machine.

In some embodiments, the agent-insertion module may locate a return point of a memory allocation function of the virtual machine and set an execution trigger associated with the memory allocation function at a point before the return point. The execution trigger may be configured to transfer control to the agent-insertion module to allow the agent-insertion module to insert, into memory allocated by the memory allocation function, the one or more computer executable instructions configured to allocate a region of memory for the agent of the virtual appliance.

The one or more computer-executable instructions configured to allocate a region of memory for the agent of the virtual appliance may be configured to call a memory allocation function of the virtual machine and return an address of a memory region allocated by the memory allocation function to the agent-insertion module. The agent-insertion module may insert the agent into the virtual machine at the memory region allocated by the memory allocation function.

The agent-insertion module may save a copy of data in the first location of the virtual machine before inserting the one or more computer-executable instructions configured to allocate the region of memory for the agent. After the region of memory for the agent is allocated, the agent-insertion module may restore, to the first location of the virtual machine, the copy of data from the first location of the virtual machine.

In some embodiments, the exception may be an invalid-op-code exception. In such embodiments, the agent-insertion module may trigger the exception by inserting an instruction with an invalid op code into a memory location pointed to by an instruction register (e.g., an enhanced-instruction-pointer register) of the virtual machine. The agent-insertion module may save a copy of data in the memory location pointed to by the instruction register before inserting the instruction with the invalid op code in the memory location pointed to by the instruction register. The agent-insertion module may also save a copy of data in the exception handler memory location of the virtual machine before inserting the one or more computer-executable instructions configured to facilitate transfer of control from the virtual machine to a virtual appliance. After the exception has been triggered, the agent-insertion module may restore, to the exception handler memory location, the copy of data from the exception handler memory location and/or restore, to the memory location pointed to by the instruction register, the copy of data from the memory location pointed to by the instruction register.

In some embodiments, before inserting the agent into the virtual machine, the agent-insertion module may resolve one or more references in the agent to kernel service functions of the virtual machine. The agent-insertion module may resolve the references by, before the virtual machine boots, (1) setting an execution trigger on address space of the virtual machine, the execution trigger being configured to transfer control to the virtual appliance, (2) identifying an export table of an executable image of the virtual machine, and (3) identifying one or more entry points for one or more exported kernel service functions.

According to certain embodiments, the agent-insertion module may set a write trigger on a region of memory in the virtual machine where the agent of the virtual appliance is inserted. In some embodiments, the agent-insertion module may return control to the virtual machine after inserting the in-guest kernel agent into the virtual machine.

After the agent of the virtual appliance has been inserted, an agent invocation module may identify an event that triggers invocation of the virtual agent. In response to the triggering event, the agent-invocation module may insert, into an exception handler memory location of the virtual machine, one or more computer-executable instructions configured to transfer execution to a memory location where the agent of the virtual appliance is stored. The agent-invocation module may then trigger an exception during execution of the virtual machine to cause the agent of the virtual appliance to execute. In various embodiments, the agent may be inserted into the virtual machine after the invocation-triggering event is identified.

In some embodiments, the agent-invocation module may determine that the virtual machine is running in a user mode and may transition the virtual machine from the user mode to a kernel mode before invoking the agent. The agent-invocation module may also transition the virtual machine from the kernel mode to the user mode after the agent finishes executing. In certain embodiments, the agent-invocation and/or agent-insertion module may remove the agent from the virtual machine after the agent finishes executing.

A system of the instant disclosure may include at least one processor, an agent-insertion module, and an agent-invocation module. The agent-insertion module may direct the at least one processor to (1) insert, into a first exception handler memory location of a virtual machine, one or more computer-executable instructions configured to facilitate transfer of control from the virtual machine to a virtual appliance, (2) trigger an exception during execution of the virtual machine to cause the one or more computer-executable instructions in the exception handler memory location to be executed, (3) obtain control from the virtual machine after the at least one computer-executable instruction executes, and (4) insert the agent of the virtual appliance into the virtual machine.

The agent-invocation module may direct the at least one processor to (1) identify an event that triggers invocation of the virtual agent, (2) insert, into a second exception handler memory location of a virtual machine, one or more computer-executable instructions configured to transfer execution to a memory location where the agent of the virtual appliance is stored, and (3) trigger an exception during execution of the virtual machine to cause the agent of the virtual appliance to execute. In some embodiments, the first exception handler memory location comprises the second exception handler location. In at least one embodiment, the system may include a virtual appliance configured to run at least one refactored kernel component shared by a plurality of virtual machines. The virtual appliance may include the agent-insertion module and the agent invocation module.

Features from any of the above-mentioned embodiments may be used in combination with one another in accordance with the general principles described herein. These and other embodiments, features, and advantages will be more fully understood upon reading the following detailed description.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
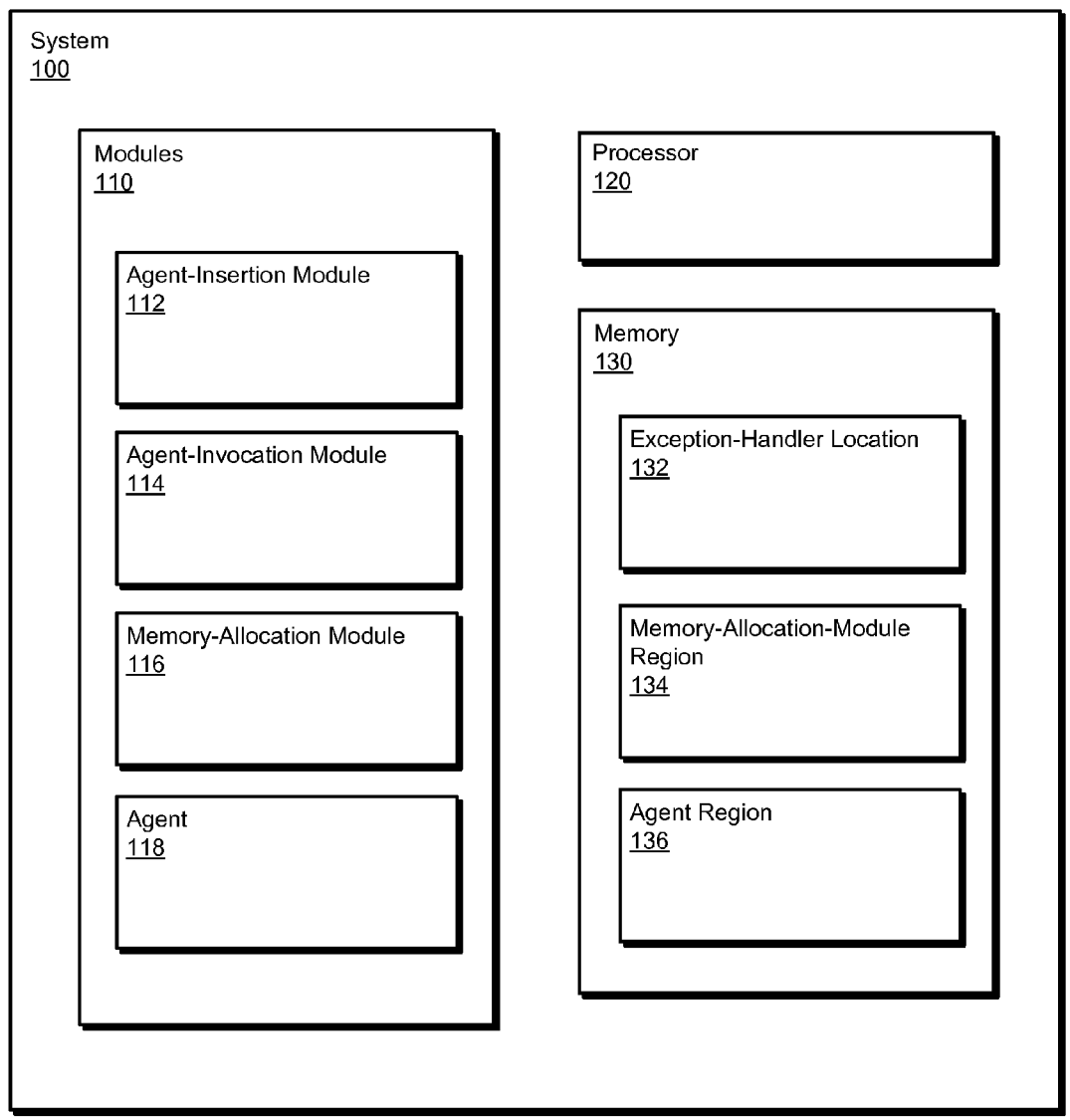
FIG. 1 is a block diagram of an exemplary system for inserting and invoking an agent of a virtual appliance according to certain embodiments.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the instant disclosure.

DETAILED DESCRIPTION

As more and more virtual machines are included on a single physical machine, refactoring common kernel components shared by virtual machines running on the physical machine may provide increased efficiency by reducing overall resource consumption. A refactored kernel component typically runs on a special virtual machine called a virtual appliance. In a virtual appliance architecture, a separate virtual machine on a virtualized server may be used to perform various operating, including analysis, filtering, and/or transformation operations on the critical path of network, disk I/O, and/or virtual memory accesses in other virtual machines. A virtual appliance may communicate with an in-guest agent in each of the virtual machines to perform certain operations. An in-guest agent may support high-level context-dependent operations, such as identifying the process that owns a particular guest physical memory page or currently uses a particular network port, injecting a block into the file system cache, resolving a kernel deadlock, or the like.

Because of the semantics gap in Hardware Abstraction Layer ("HAL")-based virtualization, a physical machine's virtual appliance may need the support of per-virtual machine in-guest agents to perform virtual machine-specific operations such as kernel data structure access and modification. To simplify deployment, in some embodiments an agent may be automatically injected into guest virtual machines instead of being manually injected by a data center administrator. Embodiments of the instant disclosure may also protect the integrity of in-guest agents at run time, which may be particularly important when the underlying refactored kernel service is security-related. For example, an agent injection and/or insertion module may inject an agent into a user virtual machine without manual installation and may invoke the agent's functions in a way that may be substantially invisible to a user virtual machine's kernel.

Conceptually, embodiments of the instant disclosure may be designed to inject a piece of arbitrary binary code into a virtual machine's kernel and then execute the code within the virtual machine's kernel address space in a way that does not require installing any new code in that virtual machine. Moreover, other than calling kernel service functions, the execution of the injected code may be invisible to and thus difficult to intercept by the virtual machine into which it is injected. Embodiments of the instant disclosure provide an out-of-virtual-machine kernel code injection mechanism that may replicate the main functionality of a kernel loader outside the virtual machine whose kernel is the target of code injection, and therefore may not need to involve the virtual machine (or its kernel loader) at all.

Figure 2:
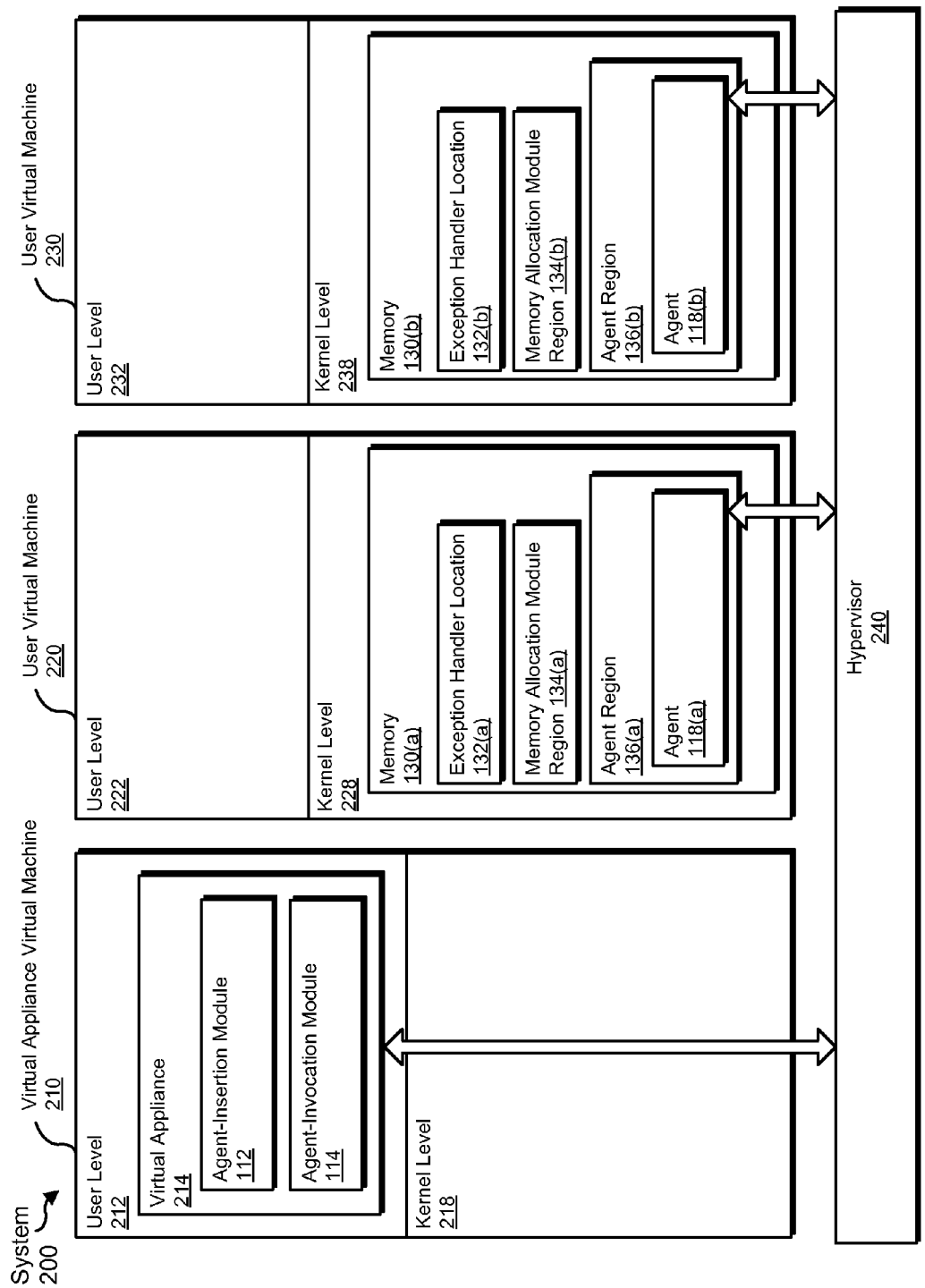
FIG. 2 is a block diagram of another exemplary system for inserting and invoking an agent of a virtual appliance according to certain embodiments.
Figure 3:
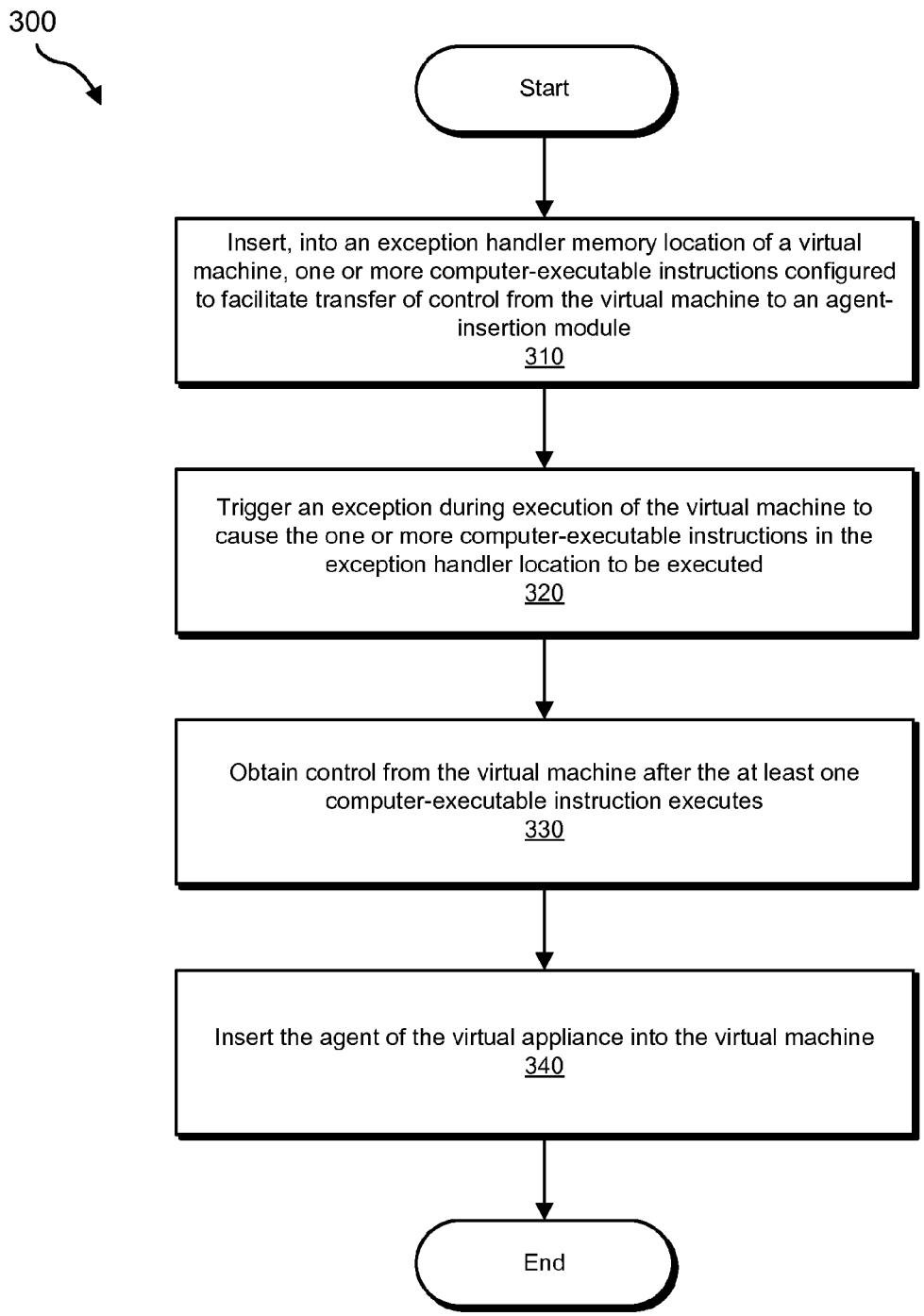
FIG. 3 is a flow diagram of an exemplary method for inserting an agent of a virtual appliance according to certain embodiments.
Figure 5:
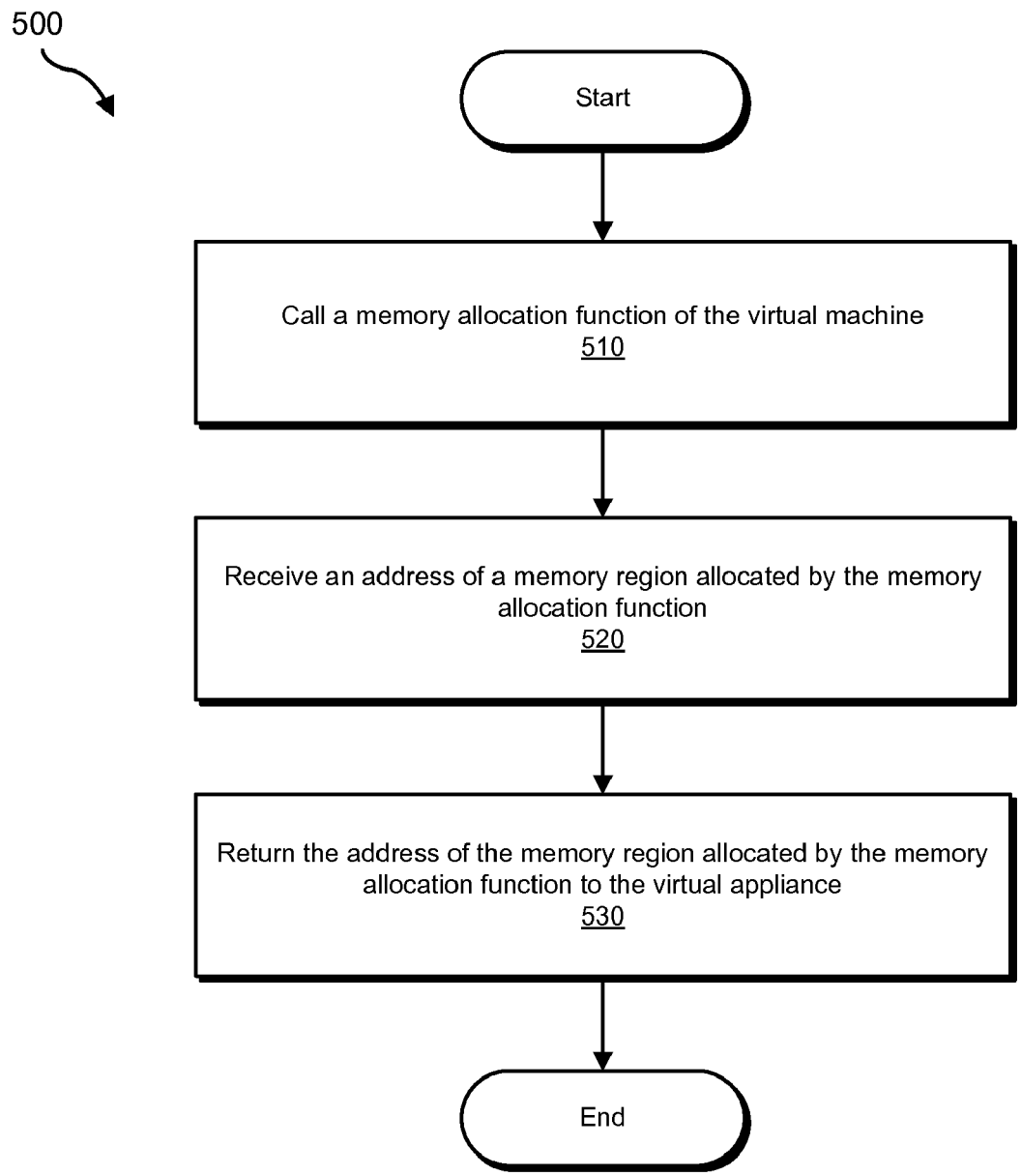
FIG. 5 is a flow diagram of an exemplary method performed by code configured to allocate a region of memory for an agent of a virtual appliance according to certain embodiments.
Figure 6:
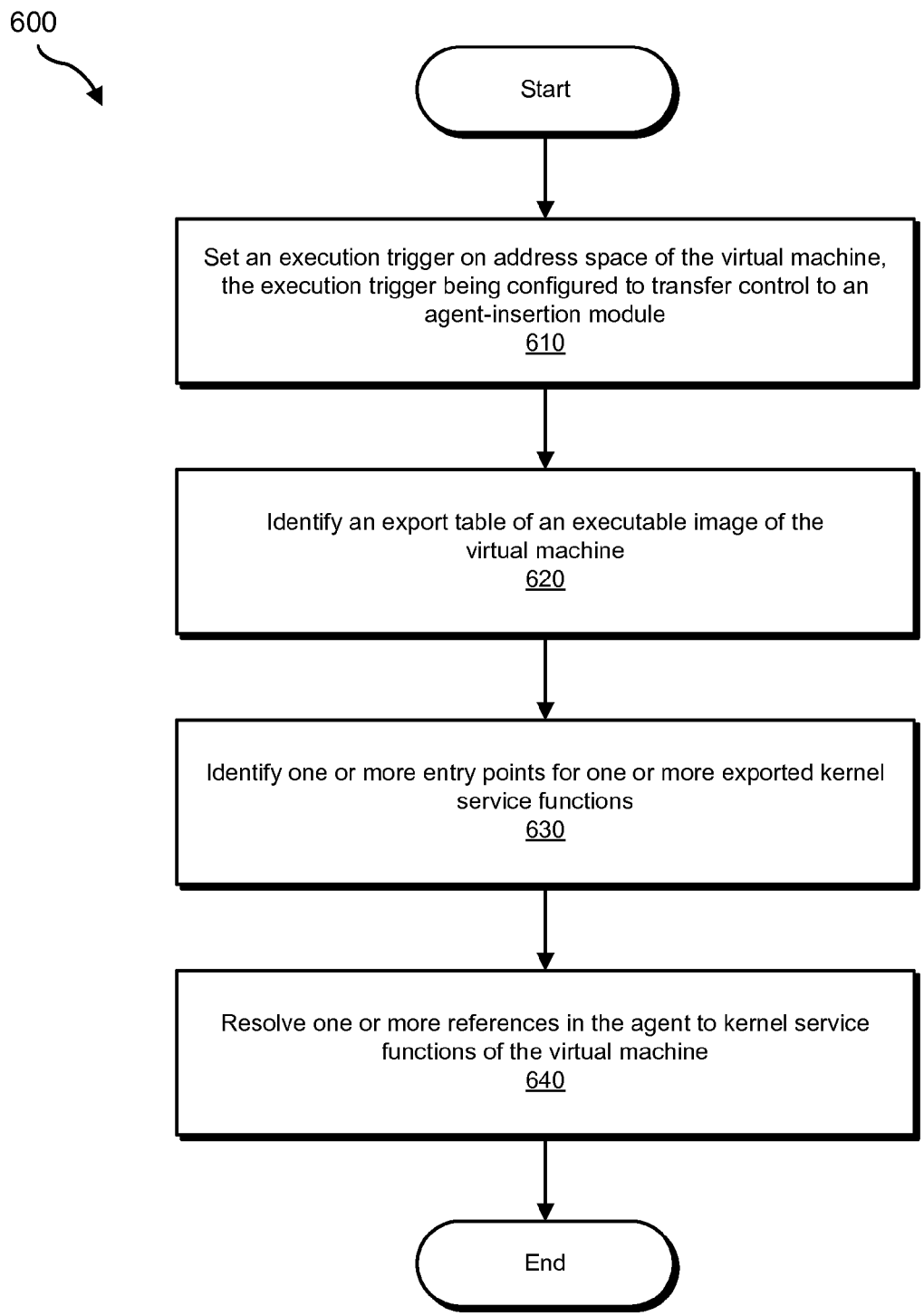
FIG. 6 is a flow diagram of an exemplary method for resolving one or more references in an agent to kernel service functions of a virtual machine according to certain embodiments.
Figure 7:
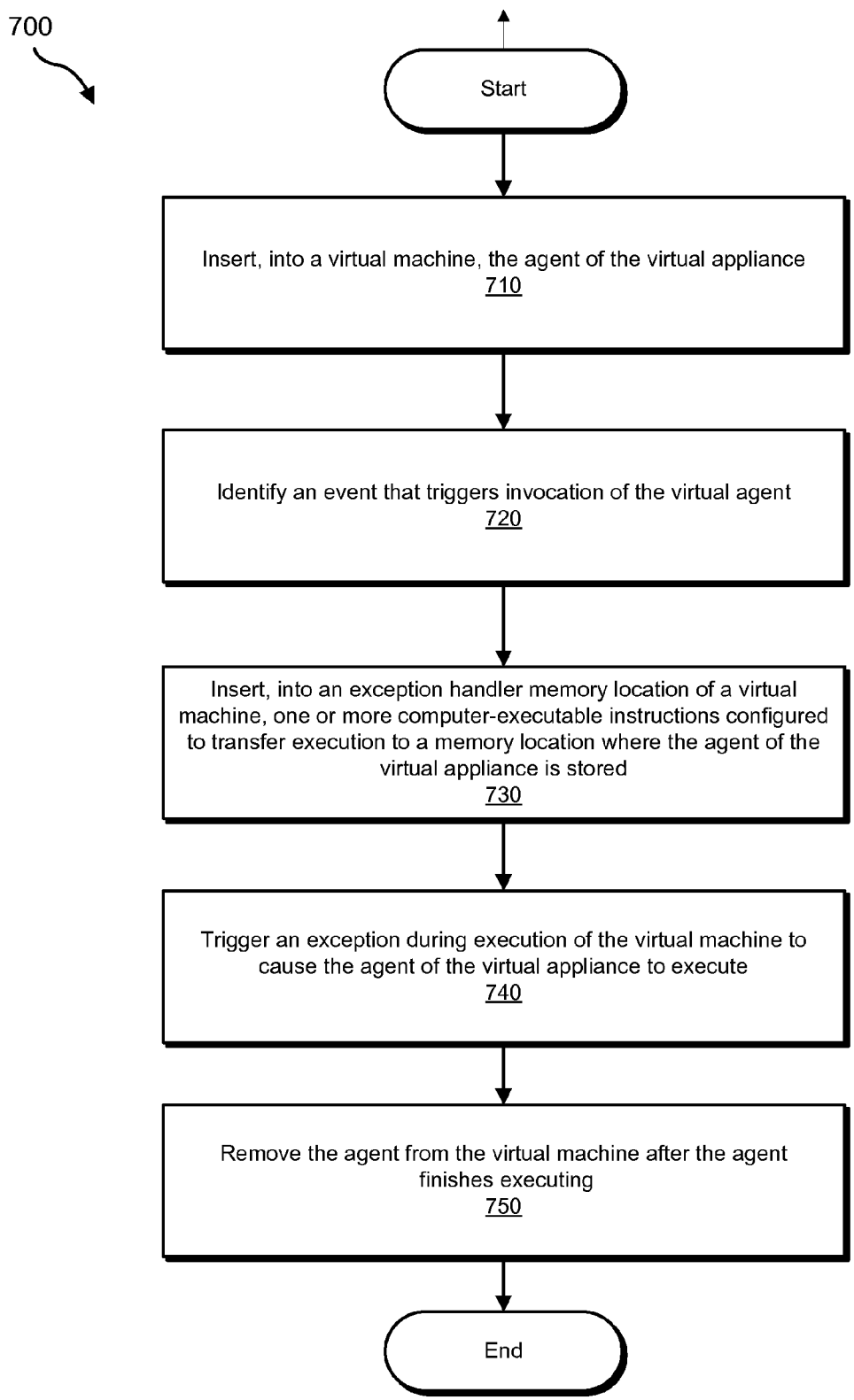
FIG. 7 is a flow diagram of an exemplary method for invoking an agent of a virtual appliance according to certain embodiments.
Figure 8:
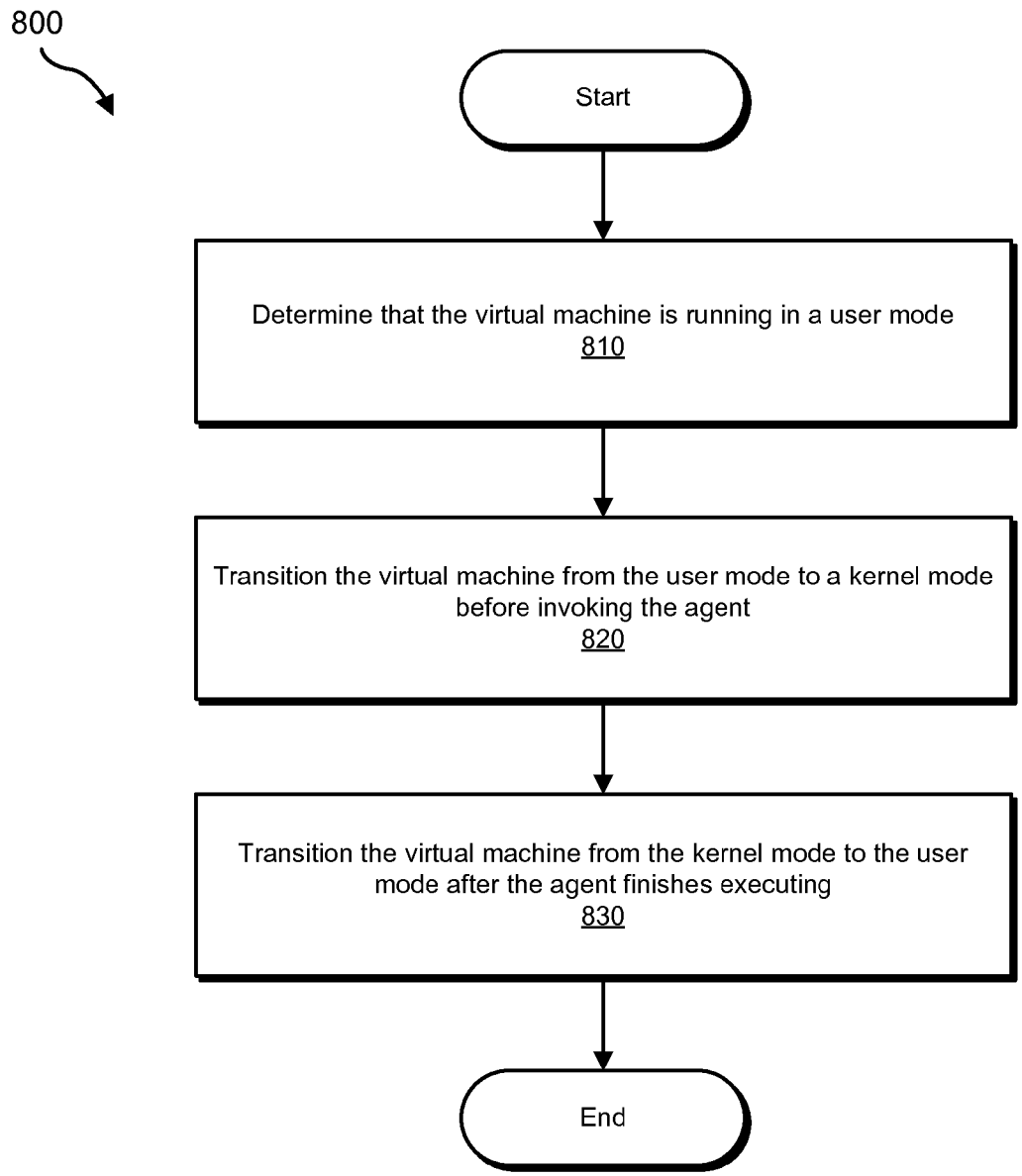
FIG. 8 is a flow diagram of an exemplary method for transitioning a virtual machine from a user mode to a kernel mode to allow an agent to execute on the virtual machine according to certain embodiments.
Figure 9:
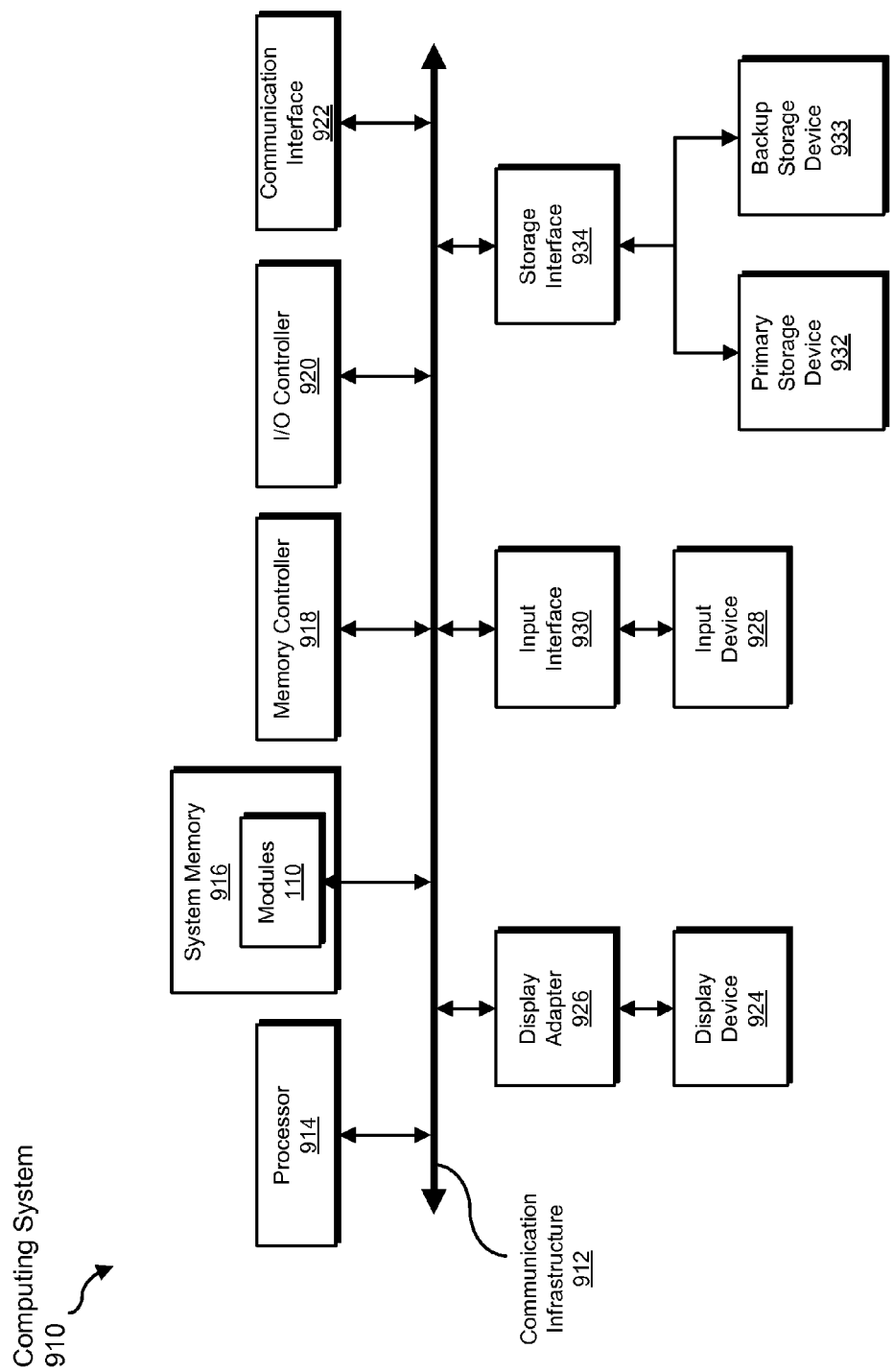
FIG. 9 is a block diagram of an exemplary computing system capable of implementing one or more of the embodiments described and/or illustrated herein.
Figure 10:
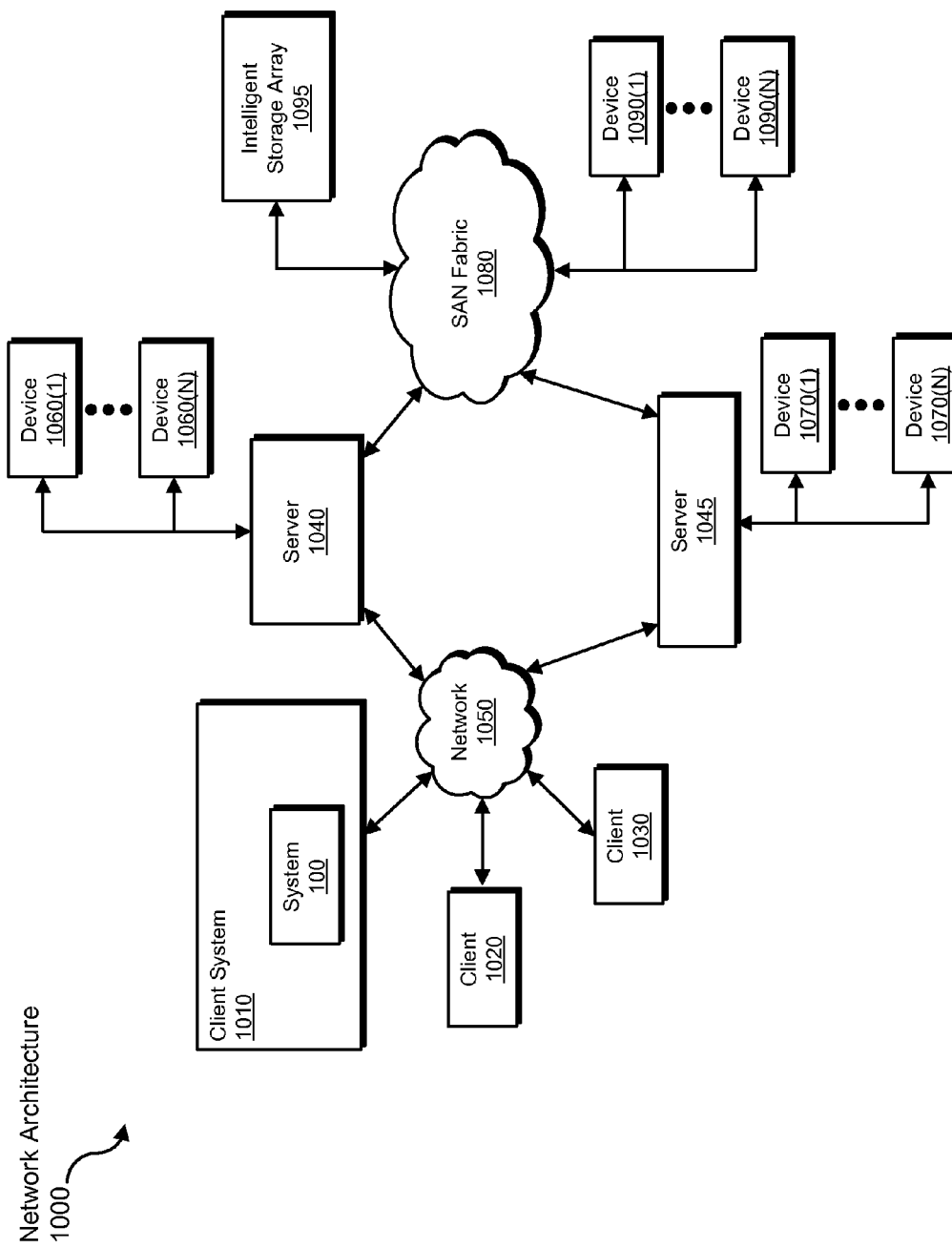
FIG. 10 is a block diagram of an exemplary computing network capable of implementing one or more of the embodiments described and/or illustrated herein.

In the following disclosure, FIGS. 1 and 2 present exemplary systems for injecting and invoking agents of virtual appliances. FIG. 3 presents an exemplary method for injecting an agent into a virtual machine, FIG. 4 presents a more detailed example of injecting an agent into a virtual machine, and FIG. 5 presents steps performed by a memory allocation module. FIG. 6 illustrates an exemplary method for preparing an agent for insertion by resolving one or more references in the agent to kernel service functions of a virtual machine. FIG. 7 shows an exemplary method for invoking an agent, and FIG. 8 shows an exemplary method for transitioning a virtual machine to a kernel mode to allow the agent to be invoked. FIGS. 9 and 10 illustrate an exemplary computing system and network architecture for implementing embodiments of the instant disclosure.

FIG. 1 illustrates a system 100 capable of inserting and/or invoking an agent of a virtual appliance. As shown, system 100 includes modules 110, a processor 120, and memory 130. Modules 110 may include an agent-insertion module 112, an agent-invocation module 114, a memory-allocation module 116, and an agent 118. In some embodiments, agent-insertion module 112 and/or agent-invocation module 114 may be part of a virtual appliance. Agent-insertion module 112 may be programmed to perform one or more of the steps involved in inserting an agent into a virtual machine, and agent-invocation module 114 may be programmed to perform one or more of the steps involved in invoking an agent in a virtual machine. Memory-allocation module 116 may include code programmed to be inserted into the virtual agent and to allocate memory in the virtual agent (e.g., memory-allocation module 116 may be a bootstrap mechanism for invoking a memory allocation function of a virtual machine).

Agent 118 may include any code programmed to run in a virtual machine and communicate with a virtual appliance external to the virtual machine. Agent 118, which may also be referred to as an in-guest agent, may perform various functions on behalf of a virtual appliance. As previously noted, an in-guest agent, such as agent 118, may support high-level context-dependent operations, injecting a block into the file system cache, resolving a kernel deadlock, and/or any other suitable task.

In certain embodiments, one or more of modules 110 in FIG. 1 may represent one or more software applications or programs that, when executed by a computing system, may cause the computing system to perform one or more steps disclosed herein. For example, as will be described in greater detail below, one or more of modules 110 may represent software modules configured to run on one or more computing devices, such as computing system 910 in FIG. 9 and/or portions of exemplary network architecture 1000 in FIG. 10. One or more of modules 110 in FIG. 1 may also represent all or portions of one or more special-purpose computers configured to perform one or more of the tasks associated with the steps disclosed herein.

In some embodiments, one or more of the modules and/or computer executable instructions discussed herein may include instructions that execute directly on a physical machine running the virtual machine. For example, the modules and computer-executable instructions discussed herein may include assembly and/or machine language instructions. The instructions may be programmed to execute on any suitable instruction set architecture. For example, the instructions may be programmed to execute on an x86 architecture, a Reduced Instruction Set Computer ("RISC") architecture, an Itanium ("IA-64") architecture, a POWER architecture, a Scalable Processor Architecture ("SPARC") architecture, and/or any other suitable architecture.

Processor 120 of system 100 may include one or more microprocessors and/or central processing units configured to execute one or more instructions of one or more of modules 110. For example, processor 130 may include processor 914 in FIG. 9. Processor 120 may be communicatively coupled to memory 130, which may include an exception-handler location 132, a memory-allocation-module region 134, and an agent region 136. Exception-handler location 132 may include a virtual machine memory location that includes code associated with handling an exception of the virtual machine. Memory-allocation-module region 134 may include a region of memory of a virtual machine to which memory-allocation module 116 may be inserted. Agent region 136 may include a region of memory of a virtual machine to which agent 118 may be inserted.

FIG. 2 illustrates a system 200 that provides an exemplary configuration of components of system 100. System 200 may include a virtual-appliance virtual machine 210, a user virtual machine 220, and a user virtual machine 230. System 200 may also include a hypervisor 240. FIG. 2 shows a virtual appliance execution architecture in which one or more common kernel services in user virtual machines 220 and 230 may be refactored to a user-level application running on virtual-appliance virtual machine 210.

Virtual-appliance virtual machine 210 may include a user level 212 and a kernel level 218. User level 212 may include a virtual appliance 214, which may include agent-insertion module 112 and agent-invocation module 114. As used herein, the phrase "virtual appliance" may refer to any computer-executable code that executes one or more common kernel components of two or more virtual machines. While FIG. 2 shows a virtual appliance that may run common kernel components of two virtual machines, a virtual appliance may support any number of virtual machines. A virtual appliance may be a software appliance designed to run on a virtual machine. A virtual appliance may reduce redundancies between virtual machines through kernel component refactoring, which is a process for taking out common kernel components shared by VMs running on a physical machine and running the common components on the virtual appliance. In some embodiments, a virtual appliance may include a software application combined with just enough operating system (JeOS) to run on a physical machine.

Returning to FIG. 2, user virtual machine 220 may include a user level 222 and a kernel level 228. An agent 118(a) may be injected into user virtual machine 220 at kernel level 228. Kernel level 228 may include memory 130(a), which may include exception handler location 132(a), memory allocation module region 134(a), and agent region 136(a). As shown, agent 118(a) may be injected into memory 130(a) at agent region 136(a). Similarly, user virtual machine 230 may include a user level 232 and a kernel level 238. An agent 118(b) may be injected into user virtual machine 230 at kernel level 238. Also, kernel level 238 may include memory 130(b), which may include exception handler location 132(b), memory allocation module region 134(b), and agent region 136(b). As shown, agent 118(b) may be injected into memory 130(b) at agent region 136(b).

Hypervisor 240 may manage user virtual machines 220 and 230. Hypervisor 240 may include any suitable virtualization software, such as VMWARE, ORACLE VM, ESX SERVER, LYNXSECURE, TRANGO, IBM POWER, and/or any other suitable hypervisor.

FIG. 3 shows an exemplary method 300 for inserting an agent of a virtual machine into a virtual appliance. The steps shown in FIG. 3 may be performed by any suitable computer-executable code and/or computing system. In some embodiments, the steps shown in FIG. 3 may be performed by agent-insertion module 112. At step 310, agent-insertion module 112 may insert, into exception handler location 132(a) of user virtual machine 220, one or more computer-executable instructions configured to facilitate transfer of control from user virtual machine 220 to agent-insertion module 112. For example, agent-insertion module 112 may insert a jump or branch instruction into exception handler location 132(a). The jump instruction may jump to code that allocates memory for agent 118(a) (e.g., memory allocation module 116) and transfers control to agent-insertion module 112 to allow agent-insertion module 112 to insert agent 118(a) into user virtual machine 220. The jump instruction may also jump to code that transfers control to agent-insertion module 112 in any other suitable manner. The one or more computer-executable instructions configured to facilitate transfer of control from the virtual machine to agent-insertion module 112 may also include other instructions in addition to or instead of a jump instruction.

Returning to FIG. 3, at step 320, agent-insertion module 112 may trigger an exception during execution of user virtual machine 220 to cause the one or more computer-executable instructions in exception handler location 132(a) to be executed. Agent insertion module 112 may trigger the exception in a variety of manners. For example, as will be described below, agent-insertion module 112 may trigger the exception by inserting an instruction that triggers an exception into user virtual machine 220.

Embodiments of the instant disclosure may be implemented using any exception that may cause execution to be transferred to a location where memory-allocation module 116 (or any other code configured to enable insertion of an agent) has been inserted. For example, agent-insertion module 112 may insert an instruction with an invalid op code into user virtual machine 220 to cause an "invalid op code" exception. When the instruction with the invalid op code is executed, control may be transferred to the memory location where the invalid op code handler is expected to reside (i.e., the location, such as exception handler location 132(a), where agent-insertion module 112 inserted the one or more computer-executable instructions configured to facilitate transfer of control from virtual machine 220 to agent-insertion module 112).

At step 330, agent-insertion module 112 may obtain control from user virtual machine 220 after the computer-executable instruction (or instructions) in exception handler location 132(a) executes. Agent-insertion module 112 may obtain control when agent-insertion module 112, rather than user virtual machine 220, executes on an underlying physical system. In some embodiments, agent-insertion module 112 may obtain control as a direct result of execution of the computer-executable instruction in exception handler location 132(a). In other embodiments, one or more steps may be performed after the instruction in the exception handler location executes and before agent-insertion module 112 obtains control. For example, the instruction in the exception handler memory location may transfer control to memory-allocation module 116, and memory-allocation module 116 may facilitate memory allocation for a region of memory where the agent may be inserted. Then, memory-allocation module 116 may transfer control to agent-insertion module 112.

After obtaining control from user virtual machine 220, at step 340 agent-insertion module 112 may insert the agent of the virtual appliance into virtual machine 220. For example, agent-insertion module 112 may insert agent 118(a) of virtual appliance 214 into user virtual machine 220 by copying agent 118(a) to agent region 136(a). Thus, agent 118(a) may be deployed in a manner that is transparent to users. Steps 310-340 may be repeated to insert agent 118(b) into user virtual machine 230 and/or to insert other agents into other user virtual machines.

Figure 4A:
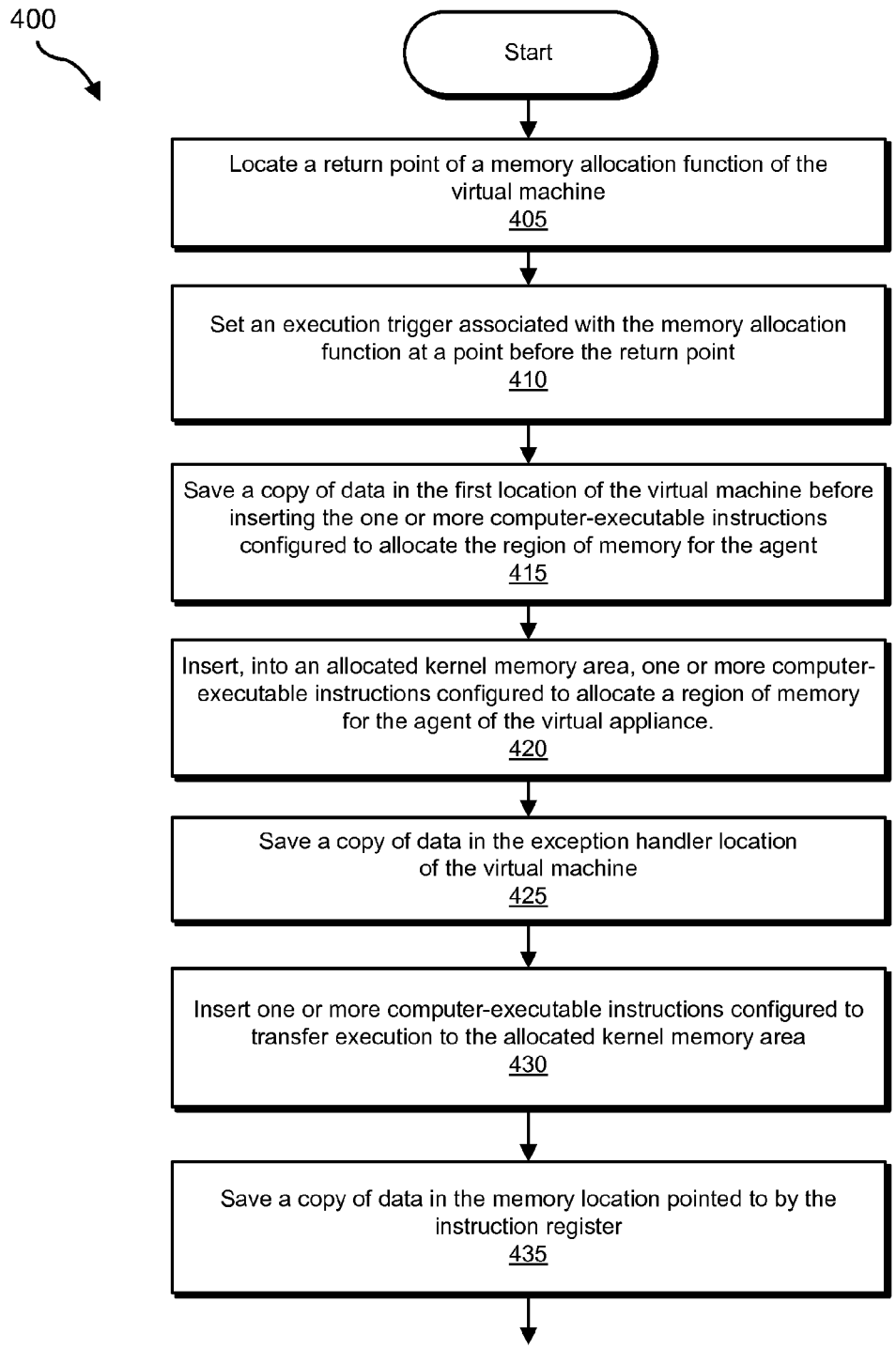
FIGS. 4A and 4B show another flow diagram of an exemplary method for inserting an agent of a virtual appliance according to certain embodiments.
Figure 4B:
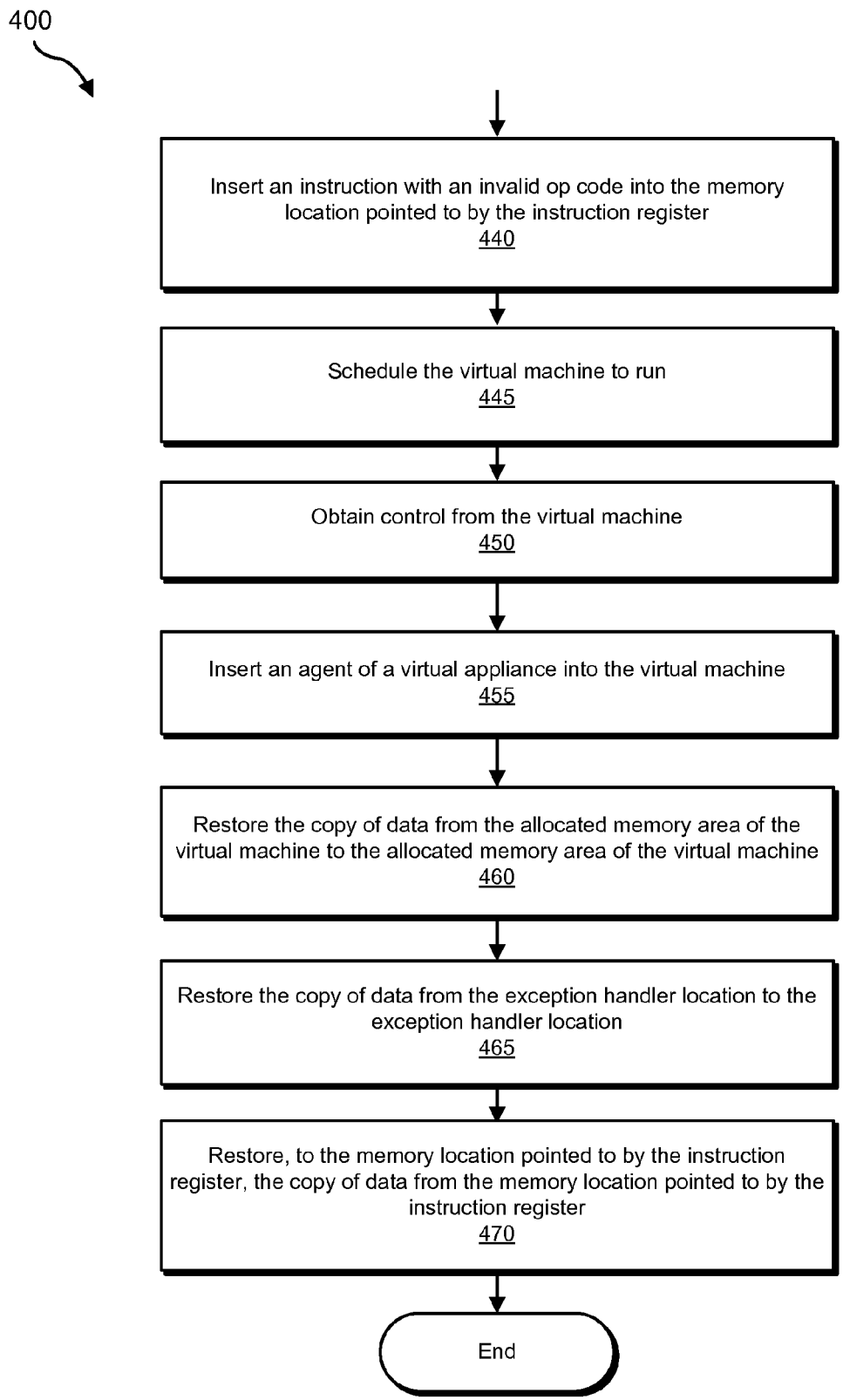

FIGS. 4A and 4B illustrate an example of how the steps shown in FIG. 3 may be implemented in an x86 environment. As with FIG. 3, the steps shown in FIGS. 4A and 4B may be performed by any suitable computer-executable code and/or computing system. In some embodiments, the steps shown in FIGS. 4A and 4B may be performed by agent-insertion module 112. At step 405, agent-insertion module 112 may locate a return point of a memory allocation function of virtual machine 220. For example, agent-insertion module 112 may parse the function body of a memory allocation function (e.g., ExAllocatePool) to locate a return instruction of the memory allocation function.

At step 410, agent-insertion module 112 may set an execution trigger associated with the memory allocation function at a point before the return instruction. The execution trigger may be configured to transfer control to agent-insertion module 112 to allow agent-insertion module 112 to insert, into memory allocated by the memory allocation function (e.g., memory allocation module region 134(a)), memory allocation module 116. For example, agent-insertion module 112 may set an execution trigger at a memory page containing the return instruction of the memory allocation function. As virtual machine 220 boots up, the first time its kernel calls the memory allocation function and is about to return, the execution trigger may fire and agent-insertion module 112 may take control. At this point, a kernel memory area, such as memory allocation module region 134(a), has been allocated by the memory allocation function.

At step 415, agent-insertion module 112 may save a copy of data in the allocated kernel memory area (e.g., memory allocation module region 134(a)), and at step 420 agent-insertion module 112 may insert, into the allocated kernel memory area, memory allocation module 116, which may include one or more instructions configured to facilitate transfer of control from the virtual machine to a virtual appliance. In steps 405-420, agent-insertion module 112 may "hijack" a kernel memory area by copying memory-allocating bootstrap code (e.g., memory-allocation module 116) to it. After execution of the bootstrap code, control may return to the original caller of the hijacked memory allocation function. This technique may be effective in x86 instruction architecture because a memory allocation function (e.g., ExAllocatePool) may be called at least once (typically multiple times) during startup of a virtual machine. This procedure may guarantee that memory-allocation module 116 may be inserted into an unused region of memory. In an alternative embodiment, memory-allocation module 116 may be inserted in a kernel image's Portable Executable ("PE") header.

At step 425, agent-insertion module 112 may save a copy of data in exception handler location 132(a) of user virtual machine 220 before inserting one or more computer-executable instructions into exception handler location 132(a) of virtual machine 220. At step 430, agent-insertion module 112 may insert, into exception handler location 132(a) of virtual machine 220, one or more computer-executable instructions configured to transfer execution to memory allocation module region 134(a).

At step 435, agent-insertion module 112 may save a copy of data in the memory location pointed to by an instruction register of user virtual machine 220 (e.g., an EIP register), and at step 440 agent-insertion module 112 may insert an instruction with an invalid op code into the memory location pointed to by the instruction register of user virtual machine 220. In some embodiments, the instruction register of user virtual machine 220 may be directly modified. However, direct modification of the instruction register may be problematic because at the time agent 118(a) is invoked, the current instruction register of the operating system of virtual machine 220 may point to an instruction of a user process, and its associated execution context (e.g. stack and heap) may not be appropriate for the execution of agent 118(a) or memory-allocation module 116. Thus, as illustrated in FIG. 4, in some embodiments agent-insertion module 112 may modify the entry point of a handler for an invalid op code exception and intentionally trigger an invalid op code exception to transfer control to an injected agent.

At step 445, agent-insertion module 112 may schedule user virtual machine 220 to run, which may trigger the exception during execution and cause control to be transferred to memory-allocation module 116. In some embodiments, to avoid a double fault problem, when control reaches memory-allocation module 116, memory-allocation module 116 may return from the exception handler to another piece of code in memory-allocation module 116 that calls a memory allocation function of user virtual machine 220.

At step 450, agent-insertion module 112 may obtain control from virtual machine 220 after memory-allocation module 116 executes. In some embodiments, memory-allocation module 116 may provide agent-insertion module 112 with a pointer to a memory region allocated by the memory allocation function of the virtual machine. To transfer control to agent-insertion module 112, a breakpoint feature of the virtualization technology running the virtual machine may be used. For example, a special unused memory page may be allocated, a write trigger may be set on the page, and the page may be intentionally written to at run time.

After control is transferred to agent-insertion module 112, at step 455 agent-insertion module 112 may insert agent 118(a) of virtual appliance 214 into virtual user machine 220. After agent 118(a) has been installed, agent-insertion module 112 may restore data saved from user virtual machine 220. For example, at step 460 agent-insertion module 112 may restore, to memory allocation module region 134(a), the copy of data saved from memory allocation module region 134(a). At step 465, agent-insertion module 112 may restore, to exception handler location 132(a), the copy of data saved from exception handler location 132(a). At step 470, agent-insertion module 112 may restore, to the memory location pointed to by the instruction register, the copy of data saved from the memory location pointed to by the instruction register.

In some embodiments, steps 405-470 may be repeated for one or more other virtual machines managed by hypervisor 240. For example, steps 405-470 may be repeated for user virtual machine 230. Steps 405-470 may also be repeated for any number of other virtual machines.

As illustrated in FIGS. 4A and 4B, loading an in-guest agent from a virtual appliance into a virtual machine may include: (1) allocation of a kernel memory region to hold the agent and (2) installation of at least one pointer in the kernel to invoke the agent. Allocation of a kernel memory region may include installation of a bootstrapping driver. The following bootstrapping strategy may be used: (1) copy a guest physical memory page of the virtual machine to the virtual appliance; (2) insert the bootstrap driver into the physical memory page; (3) copy the memory location pointed to by the virtual machine's "invalid op code" interrupt descriptor table ("IDT") entry to the virtual appliance and replace it with a jump instruction to the bootstrap driver; (4) copy the memory location pointed to by the virtual machine's Enhanced Instruction Pointer ("EIP") to the virtual appliance and replace it with an instruction with an invalid op code; (5) schedule the virtual machine to run next, such that the virtual machine may a) immediately encounter an "invalid op code" exception because its EIP points to an invalid instruction and b) jump to the bootstrap driver; (6) cause the bootstrap driver to make a standard kernel API call to allocate a kernel memory region, which in turn may return the region's address space range to the virtual appliance and return control to the virtual appliance; and (7) cause the virtual appliance to copy the actual in-guest agent to the allocated address space range and restore the physical memory page and the memory location pointed to by the virtual machine's invalid op code IDT entry and the virtual machine's EIP to their original contents.

From this point on, when the virtual appliance is about to invoke a function in the in-guest agent, the virtual appliance may use the same mechanism used in steps 2-7 to transfer control of that function through an invalid op-code exception and retake control after the function returns. In addition, the virtual appliance may optionally zero-out the in-guest agent's in-memory image when the virtual appliance regains the control and may restore the agent's image when control is about to be transferred to the agent.

FIG. 5 illustrates exemplary functions performed by memory-allocation module 116. Once control is transferred to memory-allocation module 116 (e.g., after an exception has been triggered), at step 510, memory-allocation module 116 may call a memory allocation function of user virtual machine 220. The memory allocation function may include an ExAllocatePool function or any other function capable of allocating a region of memory. In some embodiments, the memory allocated may be memory allocated from a non-paged pool of user virtual machine 220.

After executing, the memory allocation function may return an address of an allocated memory region (e.g., agent region 136(a)). At step 520, memory-allocation module 116 may receive the address of the allocated memory region. At step 530, memory-allocation module 116 may return the address of the memory region to agent-insertion module 112, which may then insert the agent into the allocated memory region.

FIG. 6 shows steps that may be performed to prepare an agent for insertion into a virtual machine. The steps shown in FIG. 6 may be performed by any suitable computer-executable code and/or computing system. In some embodiments, the steps shown in FIG. 6 may be performed by agent-insertion module 112. FIG. 6 shows embodiments where, instead of relying on a kernel loader, agent-insertion module 112 may automatically discover the export table of a running kernel image and may reconstruct the entry points of one or more service functions that the kernel exports.

At step 610, agent-insertion module 112 may, before a virtual machine boots, set an execution trigger on address space of the virtual machine. The execution trigger may be configured to transfer control to agent-insertion module 112. The execution trigger may be established in a variety of manners. For example, the execution trigger may fire when an instruction register (e.g., an EIP register) of the user virtual machine first falls in the upper 2 Giga Bytes ("GB") of the virtual machine's address space during its boot up. The address at which the execution trigger fires may correspond to the kernel's base address.

Once the execution trigger is fired, agent-insertion module 112 may obtain control. At step 620, agent-insertion module 112 may identify an export table of an executable image of the virtual machine. In some embodiments, agent-insertion module 112 may scan from the trigger point towards a lower end of the kernel address space to look for a specific Portable Executable ("PE") signature at the end of every page (the start of a PE image may be page aligned). Once the kernel image's PE signature is located, agent-insertion module 112 may find the export table.

After finding the export table, at step 630 agent-insertion module 112 may parse the table to construct a map for entry points of exported kernel service functions. In some embodiments, agent-insertion module 112 may use a hypervisor API to translate the virtual addresses of the guest virtual pages being scanned into their corresponding guest physical addresses. At step 640, agent-insertion module 112 may resolve the references in the agent to the exported kernel service functions.

By using the process illustrated in FIG. 6, each in-guest agent may be compiled as if it is a standard operating system kernel driver. Given an agent binary, agent-insertion module 112 may perform the necessary linking using the kernel service function map derived in the boot-up phase and may relocate the base addresses in the agent binary accordingly once the memory region for the agent binary is determined. Once the binary code for an in-guest agent is ready and the kernel memory region to hold it in a target virtual machine is known, agent-insertion module 112 may insert the agent into the allocated region.

At a later point in time, the virtual appliance may need to use the agent. For example, if the virtual appliance performs one or more security functions, the agent may need to be invoked when a security event in the virtual machine occurs. FIG. 7 shows steps that may be performed to invoke an agent. The steps shown in FIG. 7 may be performed by any suitable computer-executable code and/or computing system. In some embodiments, the steps shown in FIG. 7 may be performed by agent-insertion module 112 and/or agent-invocation module 114. At step 710, agent-insertion module 112 may insert an agent of a virtual appliance into a virtual machine. Agent-insertion module 112 may insert the agent using any process described herein.

At step 720, agent-invocation module 114 may identify an event that triggers invocation of the virtual agent. The event that triggers invocation of the agent may include a security event, a backup event, a communication event, and/or any other event associated with functionality provided by the virtual appliance.

After identifying the event, agent-invocation module 114 may invoke the agent. Agent-invocation module 114 may invoke the agent using one or more of the same steps used to insert the agent (e.g., the steps illustrated in FIGS. 3 and 4). For example, at step 730 agent-invocation module 114 may insert, into an exception handler memory location of the virtual machine, one or more computer-executable instructions configured to transfer execution to a memory location where the agent is stored. At step 740, agent-invocation module 114 may trigger an exception during execution of the virtual machine to cause the agent of the virtual appliance to execute.

As an example, at a time when the agent is injected into the virtual machine, the EIP of the virtual machine may point to an instruction of a user process. There are two possible outcomes for the agent's execution. First, the agent may call a kernel service function that eventually results in termination of the user process. In this case, the kernel of the virtual machine may schedule another ready process to run once the hypervisor schedules the virtual machine to run. Second, the agent may complete its execution and return. In this situation, control may be returned to the virtual appliance and then to the interrupted EIP of the user process. However, because control may have already been returned from the invalid-opcode exception handler before calling the agent, to avoid the double fault problem, the virtual appliance may use a return instruction (e.g., an iret instruction) with proper kernel stack set-up to transfer control from the kernel to the interrupted instruction in the user process. In some embodiments, as shown in step 750, the agent may be removed from the virtual machine after the agent finishes executing.

When a virtual appliance injects an in-guest agent binary, it may include a wrapper function around the agent binary to perform various functions. In other words, an agent may include an agent binary and a wrapper function. In some embodiments, the wrapper function may determine whether to transition the virtual machine from a user mode to a kernel mode. As shown in FIG. 8, at step 810 the wrapper function may determine that the virtual machine is running in a user mode. At step 820, the wrapper function may transition the virtual machine from the user mode to a kernel mode before the agent is invoked. At step 830, the wrapper function may transition the virtual machine from the kernel mode to the user mode after the agent finishes executing. As an example of the method shown in FIG. 8, before calling the in-guest agent, the wrapper function may change an FS register's content from 0x3B to 0x30 if the interrupted EIP points to an instruction of a user process, and may restore the FS register accordingly after the in-guest agent returns.

The wrapper function may also perform various other functions. For example, after the in-guest agent returns, the wrapper function may write to a special memory page to invoke a write trigger and transfer control to the virtual appliance. After the virtual appliance transfers control back to the virtual machine, if the interrupted EIP is an instruction of a user process, the wrapper function may push the interrupted EIP to the stack and use a return instruction (e.g., an iret instruction) to return control to the interrupted user program. When a virtual-appliance-induced invalid opcode interrupt occurs, the associated interrupt handler may return to the wrapper function, which in turn may call the agent. As a result, when the agent finishes executing, control may be returned to the wrapper function.

Returning from the invalid opcode handler to a wrapper function rather than the interrupted user program may serve two purposes. First, it may avoid a double fault problem. Second, it may provide the virtual appliance with the opportunity to modify the FS register properly, which should point to TEB (segment 0x3B) in user mode and to PCR (segment 0x30) in kernel mode. Traditional virtualization technology APIs may not allow a virtual appliance to modify the FS register of another virtual machine. Thus, FS register modification may need to be done by the injected code (e.g., the wrapper function).

One of the kernel memory pages allocated during the boot-up may be dedicated to input and output arguments. A virtual appliance may put input arguments into that page, and the agent may return outputs via the same page. To protect the injected in-guest agent from unauthorized modification, the virtual appliance may set a write trigger on the injected agent's code area.

In some embodiments, to further protect the injected code from being read, the virtual appliance may zero out an in-guest agent's in-memory image when a call to the agent's functions is completed and restore the agent's image when control is about to be transferred back to the agent. Thus, an in-guest agent's image may be visible to the VM's kernel only when its functions are being executed.

Through the combination of the above techniques, embodiments of the instant disclosure may allow a virtual machine (e.g., a virtual appliance) to inject and start the execution of a piece of code in another virtual machine without involving the injected virtual machine's kernel. In-guest agents may be completely invisible to the kernel into which they are loaded, so that even when an in-guest agent's hosting kernel is compromised, the agent's integrity can still be protected. In addition, the execution of the injected code may not leave any side effects except those left by its calls to kernel service functions.

The instant disclosure describes a generic technique to simplify the deployment, and protect the integrity, of such in-guest agents. The instant disclosure also describes a run-time execution architecture that may allow an in-guest agent in a virtual appliance architecture, which may be in the form of a kernel driver, to be: 1) injected into its target guest virtual machine on demand without requiring any manual installation and 2) executed within the target guest virtual machine in a way that is protected even when the target guest's kernel is compromised. This ability may greatly simplify the complexity of deploying virtual appliances and significantly enhance the integrity of in-guest agents for security-related virtual appliance applications. In other words, the exemplary approaches described herein may represent the best of both worlds: the simplicity and security of agentless architecture and the rich functionality of agentful architecture.

The following discussion provides an example of how embodiments of the instant disclosure may be implemented to provide security with a security appliance. A security appliance virtual machine may monitor other guest virtual machines, which may run on WINDOWS XP or any other suitable operating system. Although WINDOWS XP is typically a client operating system, it is not uncommon in modern data centers that multiple WINDOWS XP clients may consolidated onto a single server. The security appliance may include the following components: (1) A security virtual appliance virtual machine. In some embodiments, this virtual machine may be created by installing a VMSAFE SDK in a suitably configured virtual machine that runs an unmodified CENTOS 5.2 LINUX system on top of a VMWARE ESX hypervisor. This virtual machine may be configured without a GUI and with 256 Mega Bytes ("MB") of memory. (2) A user-level memory-scanning security application. This application may be a normal LINUX C program written using Pthreads (Posix Theads) and linking with the VMSAFE SDK library. It may include a string signature matching module ported from an existing anti-virus product and may use a string signature database that is loaded entirely into memory at start-up time. (3) A kernel-level in-guest agent. The kernel-level in-guest agent may be a custom-made WINDOWS XP kernel driver, which may either be explicitly loaded into the kernel when the guest virtual machine starts up or injected into the guest VM using an agent-injection module.

The security virtual machine may run first, after the physical server is booted up. When the security virtual machine itself boots LINUX, the signature-scanning security application may be started as a standard LINUX server and may register specific virtualization events using a pre-defined virtualization network address and port. Thereafter, it may receive, from the hypervisor, notifications of when registered events occur in monitored virtual machine. The configuration information describing a guest virtual machine indicates that it is to be monitored by the security virtual machine. When a monitored virtual machine is powered on, the security virtual machine may be notified and may create threads and states to track the monitored virtual machine. In addition, the security virtual machine may create mappings that describe to the hypervisor how accesses to selected ranges of the guest physical address space of the monitored virtual machine are to be handled by the hypervisor.

The goal of the security virtual appliance presented in this example may be to scan the guest physical memory of other virtual machines and to check if any running programs on these virtual machines contain any malware string signatures. To do so, the security virtual appliance may detect guest physical pages that are modified and subsequently executed. More specifically, on the first attempt to execute code in a page of a monitored virtual machine, if the content of the page has not been previously scanned by the security virtual machine, the hypervisor may halt the virtual CPU whose control is about to enter the page and may map the page through to the address space of the signature-scanning security application in the security virtual machine.

The hypervisor may then signal the event to the signature-scanning security application, resulting in execution of the security application's thread associated with the monitored virtual machine. This thread may obtain access to not only the contents of the physical page that contains code about to be executed, but also to the physical page that appears next in the virtual address space of the monitored virtual machine. Having access to both pages may be important because byte sequences crossing page boundaries may match string signatures. The thread may then invoke the string signature matching to scan these two pages. Upon completion of each such scan, if the pages do not contain any signature, the signature-scanning security application may signal to the hypervisor that the page has passed inspection and can be executed, and execution of the interrupted virtual CPU in the monitored virtual machine may resume.

If the pages inspected by the signature-scanning security application are found to contain a string signature suggestive of malware, the security application may perform remediation and/or other actions in the monitored virtual machine. However, it may neither be desirable nor acceptable to simply convict the monitored virtual machine and kill the entire virtual machine. Instead, the security application may pinpoint the culprit process(es) owning the signature-containing page. To this end, the signature-scanning security application may rely on an in-guest agent to perform virtual-machine-specific operations such as identifying a process owning a particular physical page and/or terminating the process. Although this process may resemble heavyweight page fault handling, in which the security agent is executed as part of the page fault handler in the monitored virtual machine, it is different in that the security virtual machine is invoked only when control is first transferred to a page after it is modified. Thereafter, further execution of the unmodified page may not invoke the security virtual machine. If the page is modified again, however, the next attempt to execute code in the page may again trigger the execution of the security virtual machine.

The ability to track pages that are modified and subsequently executed also allows the security application to detect packed malware (malicious programs that are in an encrypted form and are self-decrypting at run time) because code pages in packed malware may first be decrypted (and thus modified) and then executed. The signature-scanning security application and the in-guest agent may share a private communication mechanism based on the hypervisor's page mapping capability. This communication mechanism may be bidirectional. It may be synchronous from the point of view of the in-guest agent, but asynchronous from the point of view of the security virtual machine. This communication mechanism may be used constantly from the moment when the in-guest agent starts execution. Run-time information regarding all processes executing on a particular monitored virtual machine may be exchanged with the security virtual machine through this communication mechanism. Using this communication mechanism, the security virtual machine may issue commands related to particular processes on the monitored virtual machine (e.g., kill a process) or obtain additional information about a process. At the same time, the in-guest agent may also issue commands to invoke functionalities that are offloaded to the external security virtual machine.

The security virtual machine may verify the in-guest driver's execution rate and execution state by executing a challenge-response communication cycle with the in-guest agent. The security virtual machine may protect, verify, and re-load, if necessary, any code loaded in the in-guest agent. The in-guest agent may be able to obtain low-level operating system state information of a monitored virtual machine at a fairly fine granularity (e.g. the contents of the process list). The in-guest agent may exchange such low-level operating system state information with the security virtual machine in near real time.

The security virtual machine may be able to scan pages of monitored guest virtual machines to identify attempts to execute real-world malware code and invoke the corresponding in-guest agent for remediation. In some embodiments, performance may be improved if packing code and data into the same page is avoided. The user-level application running on the virtual appliance may be written as multi-threaded soft real-time code. In some embodiments, the security appliance may handle concurrent scans of all monitored virtual machines simultaneously. A software engineering advantage of the virtual appliance architecture may be that, compared with kernel drivers residing in monitored VMs, implementing the same functionality in a user-level application on a virtual appliance virtual machine may be more straightforward and flexible. For example, in a memory-scanning virtual appliance, it may be easier for the signature-scanning security application to maintain a large string signature database in memory than its kernel driver counterpart.

In some embodiments, the security virtual machine may insert an in-guest agent into a monitored virtual machine at the time when the security virtual machine is about to invoke a function in the in-guest agent. When a monitored virtual machine starts up, the security virtual machine first takes control when the EIP reaches the kernel's base address and may scan the kernel address space to locate the kernel export table. Then, the security virtual machine may install an execution trigger at the return instruction of the ExAllocatePool function in the monitored virtual machine. When the monitored virtual machine's first call to ExAllocatePool is about to return, the security virtual machine may take control a second time to put a bootstrap stub into the monitored virtual machine and remove the execution trigger associated with ExAllocatePool. When the bootstrap stub executes, it may call ExAllocatePool to allocate a kernel memory area for the in-guest agent.

When the execution of the bootstrap stub ends, it may return, to the security virtual machine, the base address of the allocated kernel memory area, together with the kernel export table. At this point, the security virtual machine may take control the third time, link the in-guest agent's import table with the kernel export table, and relocate the in-guest agent's binary using the returned base address.

When the security virtual machine detects a signature match in a code page of a monitored virtual machine, it may start the remediation action by installing an in-guest kernel agent and invoking a remediation function in the in-guest kernel agent. The first step may be to copy the in-guest agent into the pre-allocated kernel memory area, modify the IDT entry associated with the invalid opcode exception handler, trigger an invalid opcode exception, and run the exception handler embedded in the in-guest agent, which may restore the IDT entry and call a wrapper function in the in-guest agent. The wrapper function may modify the FS register and call the actual remediation function in the in-guest agent via a ring0 to ring0 iret instruction. The remediation function may run and in this example may identify the process owning the matched code page, terminate the process, and return to the wrapper function. Finally, the wrapper function may restore the FS register and return control to the interrupted user program via a ring0 to ring3 iret instruction.

In some embodiments, the total time for inserting, invoking, and utilizing an in-guest agent using principles of the instant disclosure may be more efficient than installing an agent as a user program on a virtual machine. Thus, embodiments of the instant disclosure may provide more flexibility and security than previous technologies without sacrificing security.

FIG. 9 is a block diagram of an exemplary computing system 910 capable of implementing one or more of the embodiments described and/or illustrated herein. Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of processing unit capable of processing data or interpreting and executing instructions. In certain embodiments, processor 914 may receive instructions from a software application or module. These instructions may cause processor 914 to perform the functions of one or more of the exemplary embodiments described and/or illustrated herein. For example, processor 914 may perform and/or be a means for performing, either alone or in combination with other elements, one or more of the inserting, triggering, obtaining, locating, setting, saving, scheduling, restoring, calling, receiving, returning, identifying, resolving, removing, and/or transitioning steps described herein. Processor 914 may also perform and/or be a means for performing any other steps, methods, or processes described and/or illustrated herein.

System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 110 from FIG. 1 may be loaded into system memory 916.

In certain embodiments, exemplary computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an ISA, PCI, PCIe, or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912. In certain embodiments, memory controller 918 may perform and/or be a means for performing, either alone or in combination with other elements, one or more of the steps or features described and/or illustrated herein, such as inserting, triggering, obtaining, locating, setting, saving, scheduling, restoring, calling, receiving, returning, identifying, resolving, removing, and/or transitioning.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934. I/O controller 920 may be used, for example, to perform and/or be a means for performing, either alone or in combination with other elements, one or more of the inserting, triggering, obtaining, locating, setting, saving, scheduling, restoring, calling, receiving, returning, identifying, resolving, removing, and/or transitioning steps described herein. I/O controller 920 may also be used to perform and/or be a means for performing other steps and features set forth in the instant disclosure.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, SCSI host adapters, USB host adapters, IEEE 994 host adapters, SATA and eSATA host adapters, ATA and PATA host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution. In certain embodiments, communication interface 922 may perform and/or be a means for performing, either alone or in combination with other elements, one or more of the inserting, triggering, obtaining, locating, setting, saving, scheduling, restoring, calling, receiving, returning, identifying, resolving, removing, and/or transitioning steps disclosed herein. Communication interface 922 may also be used to perform and/or be a means for performing other steps and features set forth in the instant disclosure.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also include at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device. In at least one embodiment, input device 928 may perform and/or be a means for performing, either alone or in combination with other elements, one or more of the inserting, triggering, obtaining, locating, setting, saving, scheduling, restoring, calling, receiving, returning, identifying, resolving, removing, and/or transitioning steps disclosed herein. Input device 928 may also be used to perform and/or be a means for performing other steps and features set forth in the instant disclosure.

As illustrated in FIG. 9, exemplary computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 910.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

In certain embodiments, storage devices 932 and 933 may be used, for example, to perform and/or be a means for performing, either alone or in combination with other elements, one or more of the inserting, triggering, obtaining, locating, setting, saving, scheduling, restoring, calling, receiving, returning, identifying, resolving, removing, and/or transitioning steps disclosed herein. Storage devices 932 and 933 may also be used to perform and/or be a means for performing other steps and features set forth in the instant disclosure.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an application specific integrated circuit (ASIC) adapted to implement one or more of the exemplary embodiments disclosed herein.

FIG. 10 is a block diagram of an exemplary network architecture 1000 in which client systems 1010, 1020, and 1030 and servers 1040 and 1045 may be coupled to a network 1050. Client systems 1010, 1020, and 1030 generally represent any type or form of computing device or system, such as exemplary computing system 910 in FIG. 9. In one example, client system 1010 may include system 100 from FIG. 1.

Similarly, servers 1040 and 1045 generally represent computing devices or systems, such as application servers or database servers, configured to provide various database services and/or run certain software applications. Network 1050 generally represents any telecommunication or computer network including, for example, an intranet, a wide area network (WAN), a local area network (LAN), a personal area network (PAN), or the Internet.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent network-attached storage (NAS) devices configured to communicate with servers 1040 and 1045 using various protocols, such as NFS, SMB, or CIFS.

Servers 1040 and 1045 may also be connected to a storage area network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050. Accordingly, network architecture 1000 may perform and/or be a means for performing, either alone or in combination with other elements, one or more of the inserting, triggering, obtaining, locating, setting, saving, scheduling, restoring, calling, receiving, returning, identifying, resolving, removing, and/or transitioning steps disclosed herein. Network architecture 1000 may also be used to perform and/or be a means for performing other steps and features set forth in the instant disclosure.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In certain embodiments, one or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

One or more of the software modules described herein may transform data and/or representations of physical entities from one form to another. For example, an agent-insertion module may transform an agentless user virtual machine into an agent-enabled virtual machine by inserting an agent into the virtual machine.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive.

Unless otherwise noted, the terms "a" or "an," as used herein, are to be construed as meaning "at least one of." In addition, for ease of use, the words "including" and "having," as used herein, are interchangeable with and have the same meaning as the word "comprising."

We claim:

1. A computer-implemented method for inserting an agent of a virtual appliance into a virtual machine, the method being performed by a computing system comprising at least one processor, the method comprising:
   inserting, into a first exception handler memory location of the virtual machine, one or more computer-executable instructions configured to facilitate transfer of control from the virtual machine to an agent-insertion module of the virtual appliance;
   triggering an exception during execution of the virtual machine to cause the one or more computer-executable instructions in the first exception handler memory location to be executed;
   obtaining control from the virtual machine after the one or more computer-executable instructions execute;
   inserting the agent of the virtual appliance into the virtual machine, wherein:
      the agent-insertion module of the virtual appliance performs the inserting the one or more computer-executable instructions configured to facilitate transfer of control from the virtual machine to the agent-insertion module of the virtual appliance, triggering the exception, obtaining the control, and inserting the agent;
      the virtual appliance comprises code that executes one or more common kernel components of a plurality of virtual machines;
      the plurality of virtual machines comprise the virtual machine;
      the agent of the virtual appliance is programmed to run within the virtual machine and perform one or more tasks on behalf of the virtual appliance;

identifying an event that triggers invocation of the agent of the virtual appliance;

inserting, into a second exception handler memory location of the virtual machine, one or more computer-executable instructions configured to transfer control of execution to the agent of the virtual appliance;

triggering an exception during execution of the virtual machine to cause the one or more computer-executable instructions in the second exception handler memory location to execute such that execution is transferred to the agent of the virtual appliance and the agent of the virtual appliance executes, wherein an agent invocation module of the virtual appliance performs the identifying the event, the inserting the one or more computer-executable instructions configured to transfer control of execution to the agent of the virtual appliance, and the triggering the exception.

2. The computer-implemented method of claim 1, wherein the agent of the virtual appliance supports high-level context-dependent operations of the virtual appliance.

3. The computer-implemented method of claim 1, further comprising inserting, into a first memory location of the virtual machine, one or more computer-executable instructions configured to allocate a region of memory for the agent of the virtual appliance, wherein inserting the one or more computer-executable instructions configured to allocate the region of memory for the agent of the virtual appliance into the first exception handler memory location of the virtual machine comprises inserting, into the first exception handler memory location of the virtual machine, one or more computer-executable instructions configured to transfer execution to the first memory location of the virtual machine.

4. The computer-implemented method of claim 3, further comprising:
locating a return point of a memory allocation function of the virtual machine;
setting an execution trigger associated with the memory allocation function at a point before the return point, the execution trigger being configured transfer control to the agent-insertion module of the virtual appliance to allow the agent-insertion module of the virtual appliance to insert, into memory allocated by the memory allocation function, the one or more computer-executable instructions configured to allocate the region of memory for the agent of the virtual appliance.

5. The computer-implemented method of claim 3, wherein the one or more computer-executable instructions configured to allocate the region of memory for the agent of the virtual appliance are configured to:
call a memory allocation function of the virtual machine;
return an address of a memory region allocated by the memory allocation function to the agent-insertion module of the virtual appliance, wherein the agent-insertion module of the virtual appliance inserts the agent into the virtual machine at the memory region allocated by the memory allocation function.

6. The computer-implemented method of claim 3, further comprising:
saving a copy of data in the first memory location of the virtual machine before inserting the one or more computer-executable instructions configured to allocate the region of memory for the agent of the virtual appliance;
after the region of memory for the agent is allocated, restoring, to the first memory location of the virtual machine, the copy of data from the first memory location of the virtual machine.

7. The computer-implemented method of claim 1, wherein:
the exception comprises an invalid-op-code exception;
triggering the exception comprises inserting an instruction with an invalid op code into a memory location pointed to by an instruction register of the virtual machine.

8. The computer-implemented method of claim 7, further comprising:
saving a copy of data in the first exception handler memory location of the virtual machine before inserting the one or more computer-executable instructions configured to facilitate transfer of control from the virtual machine to the agent-insertion module of the virtual appliance;
saving a copy of data in the memory location pointed to by the instruction register before inserting the instruction with the invalid op code into the memory location pointed to by the instruction register;
after the exception has been triggered, restoring, to the first exception handler memory location, the copy of data from the first exception handler memory location;
after the exception has been triggered, restoring, to the memory location pointed to by the instruction register, the copy of data from the memory location pointed to by the instruction register.

9. The computer-implemented method of claim 1, further comprising resolving one or more references in the agent to kernel service functions of the virtual machine.

10. The computer-implemented method of claim 9, wherein resolving the one or more references comprises:
before the virtual machine boots, setting an execution trigger on address space of the virtual machine, the execution trigger being configured to transfer control to the virtual appliance;
identifying an export table of an executable image of the virtual machine;
identifying one or more entry points for one or more exported kernel service functions.

11. The computer-implemented method of claim 1, wherein the first exception handler memory location comprises the second exception handler memory location.

12. The computer-implemented method of claim 1, tangibly embodied as computer-executable instructions on at least one computer-readable storage medium.

13. A computer-implemented method for invoking an agent of a virtual appliance, the method being performed by a computing system comprising at least one processor, the method comprising:
inserting, into a first exception handler memory location of a virtual machine, one or more computer-executable instructions configured to facilitate transfer of control from the virtual machine to an agent-insertion module of the virtual appliance;
triggering an exception during execution of the virtual machine to cause the one or more computer-executable instructions in the first exception handler memory location to be executed;
obtaining control from the virtual machine after the one or more computer-executable instructions execute;
inserting the agent of the virtual appliance into the virtual machine, wherein the agent-insertion module of the virtual appliance performs the inserting the one or more computer-executable instructions configured to facilitate transfer of control from the virtual machine to the agent-insertion module of the virtual appliance, triggering the exception, obtaining the control, and inserting the agent;

identifying an event that triggers invocation of the agent of the virtual appliance;

inserting, into a second exception handler memory location of the virtual machine, one or more computer-executable instructions configured to transfer execution to a memory location where the agent of the virtual appliance is stored;

triggering an exception during execution of the virtual machine to cause the one or more computer-executable instructions configured to transfer execution to a memory location where the agent of the virtual appliance is stored to execute such that control of execution is transferred to the memory location where the agent of the virtual appliance is stored and the agent of the virtual appliance executes, wherein:

an agent invocation module of the virtual appliance performs the identifying the event, the inserting the one or more computer-executable instructions configured to transfer execution to a memory location where the agent of the virtual appliance is stored, and the triggering the exception;

the virtual appliance comprises code that executes one or more common kernel components of a plurality of virtual machines;

the plurality of virtual machines comprise the virtual machine;

the agent of the virtual appliance is programmed to run within the virtual machine and perform one or more tasks on behalf of the virtual appliance.

14. The computer-implemented method of claim 13, wherein the agent is inserted into the virtual machine after the invocation-triggering event is identified.

15. The computer-implemented method of claim 13, further comprising
removing the agent from the virtual machine after the agent finishes executing.

16. The computer-implemented method of claim 13, further comprising:
determining that the virtual machine is running in a user mode;
transitioning the virtual machine from the user mode to a kernel mode before invoking the agent;
transitioning the virtual machine from the kernel mode to the user mode after the agent finishes executing.

17. The computer-implemented method of claim 13, tangibly embodied as computer-executable instructions on at least one computer-readable storage medium.

18. A system comprising:
at least one processor that executes a virtual machine;
a virtual appliance, wherein:
the virtual appliance comprises an agent-insertion module that directs the at least one processor to: (1) insert, into a first exception handler memory location of the virtual machine, one or more computer-executable instructions configured to facilitate transfer of control from the virtual machine to the virtual appliance, (2) trigger an exception during execution of the virtual machine to cause the one or more computer-executable instructions configured to facilitate transfer of control from the virtual machine to a virtual appliance to be executed, (3) obtain control from the virtual machine after the one or more computer-executable instructions configured to facilitate transfer of control from the virtual machine to the virtual appliance execute, and (4) insert an agent of the virtual appliance into a memory location of the virtual machine;
the virtual appliance further comprises an agent-invocation module that directs the at least one processor to: (1) identify an event that triggers invocation of the agent, (2) insert, into a second exception handler memory location of the virtual machine, one or more computer-executable instructions configured to transfer control of execution from the virtual machine to the memory location where the agent of the virtual appliance is stored, and (3) trigger an exception during execution of the virtual machine to cause the one or more computer-executable instructions configured to transfer control of execution from the virtual machine to the memory location where the agent is stored to execute such that the agent of the virtual appliance executes;
the virtual appliance comprises code that executes one or more common kernel components of a plurality of virtual machines;
the plurality of virtual machines comprises the virtual machine.

19. The system of claim 18, wherein the first exception handler memory location comprises the second exception memory handler location.

20. The system of claim 18, wherein the one or more common kernel components of the plurality of virtual machines are refactored such that they are removed from each of the plurality of virtual machines and execute with the virtual appliance.

\* \* \* \* \*